(12) United States Patent
Oikawa et al.

(10) Patent No.: US 11,031,831 B2
(45) Date of Patent: Jun. 8, 2021

(54) ELECTRIC MOTOR AND AIR CONDITIONER

(71) Applicant: Mitsubishi Electric Corporation, Tokyo (JP)

(72) Inventors: Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 17 days.

(21) Appl. No.: 16/079,186

(22) PCT Filed: Apr. 21, 2016

(86) PCT No.: PCT/JP2016/062669
§ 371 (c)(1),
(2) Date: Aug. 23, 2018

(87) PCT Pub. No.: WO2017/183162
PCT Pub. Date: Oct. 26, 2017

(65) Prior Publication Data
US 2019/0036385 A1  Jan. 31, 2019

(51) Int. Cl.
*H02K 1/04* (2006.01)
*H02K 1/27* (2006.01)
(Continued)

(52) U.S. Cl.
CPC .............. *H02K 1/04* (2013.01); *F24F 11/46* (2018.01); *F24F 13/24* (2013.01); *H02K 1/146* (2013.01);
(Continued)

(58) Field of Classification Search
CPC ........ H02K 1/04; H02K 1/146; H02K 1/2766; H02K 1/148; H02K 1/185; H02K 1/276; H02K 5/08
See application file for complete search history.

(56) References Cited

U.S. PATENT DOCUMENTS 5,223,759 A * 6/1993 Shimoda ............. F04C 29/0085
29/598
6,441,529 B1 * 8/2002 Mimura ................. H02K 1/246
310/168
(Continued)

FOREIGN PATENT DOCUMENTS

CN 101621221 A 1/2010
CN 101895161 A 11/2010
(Continued)

OTHER PUBLICATIONS

Ishii (JP 2014230361 A) English Translation (Year: 2014).*
(Continued)

*Primary Examiner* — Tulsidas C Patel
*Assistant Examiner* — Robert E Mates
(74) *Attorney, Agent, or Firm* — Posz Law Group, PLC

(57) ABSTRACT

An electric motor includes an annular stator and a consequent-pole-type rotor including an annular rotor core disposed on the inner side of the stator and a plurality of permanent magnets disposed inside the rotor core and arrayed in a circumferential direction of the rotor core, in which the stator is covered with an unsaturated polyester resin.

11 Claims, 13 Drawing Sheets

(51) Int. Cl.
- *H02K 1/14* (2006.01)
- *F24F 11/46* (2018.01)
- *F24F 13/24* (2006.01)
- *H02K 5/08* (2006.01)
- *H02K 1/18* (2006.01)
- *H02K 15/02* (2006.01)
- *H02K 21/16* (2006.01)
- *H02K 11/215* (2016.01)

(52) U.S. Cl.
CPC .............. *H02K 1/148* (2013.01); *H02K 1/185* (2013.01); *H02K 1/2766* (2013.01); *H02K 5/08* (2013.01); *H02K 15/022* (2013.01); *H02K 21/16* (2013.01); *H02K 11/215* (2016.01)

(56) References Cited

U.S. PATENT DOCUMENTS

| | | | |
|---|---|---|---|
| 7,986,064 B2 | 7/2011 | Katagiri et al. | |
| 8,242,654 B2 | 8/2012 | Yamada et al. | |
| 2009/0284096 A1 | 11/2009 | Katagiri et al. | |
| 2010/0308680 A1 | 12/2010 | Yamada et al. | |
| 2015/0280502 A1* | 10/2015 | Hirotani | H02K 3/28 310/68 R |
| 2015/0340914 A1* | 11/2015 | Asakura | H02K 1/04 310/208 |
| 2016/0172913 A1* | 6/2016 | Baba | H02K 1/2766 417/410.3 |
| 2016/0241090 A1* | 8/2016 | Nakagawa | H02K 1/148 |

FOREIGN PATENT DOCUMENTS

| | | | | |
|---|---|---|---|---|
| JP | H04-071342 A | | 3/1992 | |
| JP | 2005-312124 A | | 11/2005 | |
| JP | 2007-336624 A | | 12/2007 | |
| JP | 2009-278814 A | | 11/2009 | |
| JP | 2010-273442 A | | 12/2010 | |
| JP | 2010273442 A | * | 12/2010 | |
| JP | 2012-244783 A | | 12/2012 | |
| JP | 2012244783 A | * | 12/2012 | |
| JP | 2014-230361 A | | 12/2014 | |
| JP | 2014230361 A | * | 12/2014 | |
| JP | 2015-106928 A | | 6/2015 | |
| KR | 10-2013-0028252 A | | 3/2013 | |
| WO | WO-2014136258 A1 | * | 9/2014 | ............... H02K 3/12 |
| WO | WO-2015045026 A1 | * | 4/2015 | |
| WO | WO-2015069062 A1 | * | 5/2015 | ............. H02K 15/12 |

OTHER PUBLICATIONS

Nigo (JP 2012244783 A) English Translation (Year: 2012).*
Yamada (JP 2010273442 A) English Translation (Year: 2010).*
International Search Report of the International Searching Authority dated Jul. 19, 2016 for the corresponding International application No. PCT/JP2016/062669 (and English translation).
Office Action dated Jul. 9, 2019 issued in corresponding JP patent application No. 2018-512726 (and English translation).
Office Action dated Jul. 18, 2019 issued in corresponding KR patent application No. 10-2018-7028019 (and English translation).
Office Action dated Jan. 7, 2020 issued in corresponding JP patent application No. 2018-512726 (and English translation).
Office Action dated Nov. 5, 2019 issued in corresponding CN patent application No. 201680084617.3 (and English translation).

* cited by examiner

THIN-WALLED CONNECTION SPLIT
CORE IN ROUNDED STATE

ELECTRIC MOTOR AND AIR CONDITIONER

CROSS REFERENCE TO RELATED APPLICATION

This application is a U.S. national stage application of International Patent Application No. PCT/JP2016/062669 filed on Apr. 21, 2016, the disclosure of which is incorporated herein by reference.

TECHNICAL FIELD

The present invention relates to an electric motor including a consequent-pole-type rotor and an air conditioner including the electric motor.

BACKGROUND

Conventionally, rare-earth magnets having high energy densities such as neodymium sintered magnets have generally been used for permanent magnets of electric motors mounted in compressors of air conditioners in order to improve energy-saving performance of the air conditioners. Electric motors using neodymium sintered magnets have been developed for fans of air conditioners. Such permanent magnets are expensive because the permanent magnets contain precious rare-earth elements. Therefore, there is a strong demand for cost reduction by reducing the usage amount and processing cost of permanent magnets.

In general, permanent magnets are made by cutting a block into a specified shape. Therefore, as the number of permanent magnets used in an electric motor increases, the processing cost increases. As a method of reducing the number of permanent magnets used in an electric motor, there is a method of forming a rotor with so-called consequent poles.

In a consequent-pole-type rotor disclosed in Patent Literature 1, magnet magnetic poles produced by permanent magnets and salient poles not produced by permanent magnets but formed in a core material are alternately arrayed in the circumferential direction. Therefore, the number of the magnet magnetic poles and the number of the salient poles are each half the number of the poles. In addition, the magnet magnetic poles whose number is half the number of the poles of the rotor have the same polarity, and the salient poles whose number is half the number of the poles have a polarity different from that of the magnet magnetic poles. Thus, in the consequent-pole-type rotor, the number of the permanent magnets is half the usual number.

However, in a consequent-pole-type rotor in which a plurality of magnet insertion holes is provided in a rotor core, and a permanent magnet is inserted into each of the plurality of magnet insertion holes, in particular, magnet magnetic poles and salient poles have different inductances. Due to this inductance imbalance, there is a problem that vibration and noise are large.

To this problem, Patent Literature 1 contrives a shape of flux barriers formed in each of a plurality of magnet insertion holes in the consequent-pole-type rotor, thereby to improve inductance asymmetry to reduce vibration and noise. The flux barriers are cavities formed in both circumferential ends of each magnet insertion hole, and are formed with the permanent magnet disposed in the magnet insertion hole.

PATENT LITERATURE

Patent Literature 1: Japanese Patent Application Laid-open No. 2012-244783

However, according to the technique disclosed in Patent Literature 1, the inductance asymmetry cannot be completely eliminated, resulting in vibration exciting force significantly larger than that of a rotor in which magnets are inserted in all magnetic poles without inductance asymmetry. In addition, since a split stator core is weaker in core rigidity than a non-split stator core, one held in a thin-walled closed container like the stator core in Patent Literature 1 is insufficient for the reduction of vibration exciting force. The split core described above includes one formed in an annular shape with a plurality of core segments having a plurality of yokes and teeth projecting from the yokes arrayed so that each of the plurality of core segments abuts another adjacent one of the plurality of core segments.

SUMMARY

The present invention has been made in view of the above, and an object of the present invention is to provide an electric motor capable of achieving lower cost, lower vibration, and lower noise.

In order to solve the above-described problems and achieve the object, an electric motor of the present invention includes an annular stator, and a consequent-pole-type rotor including an annular rotor core disposed on an inner side of the annular stator and a plurality of permanent magnets disposed inside the annular rotor core and arrayed in a circumferential direction of the annular rotor core. The annular stator is covered with an unsaturated polyester resin.

The electric motor according to the present invention has the effect that lower cost, lower vibration, and lower noise can be achieved.

DETAILED DESCRIPTION

Hereinafter, an electric motor and an air conditioner according to an embodiment of the present invention will be described in detail with reference to the drawings. Note that the invention is not limited to the embodiment.

Embodiment

Figure 1:
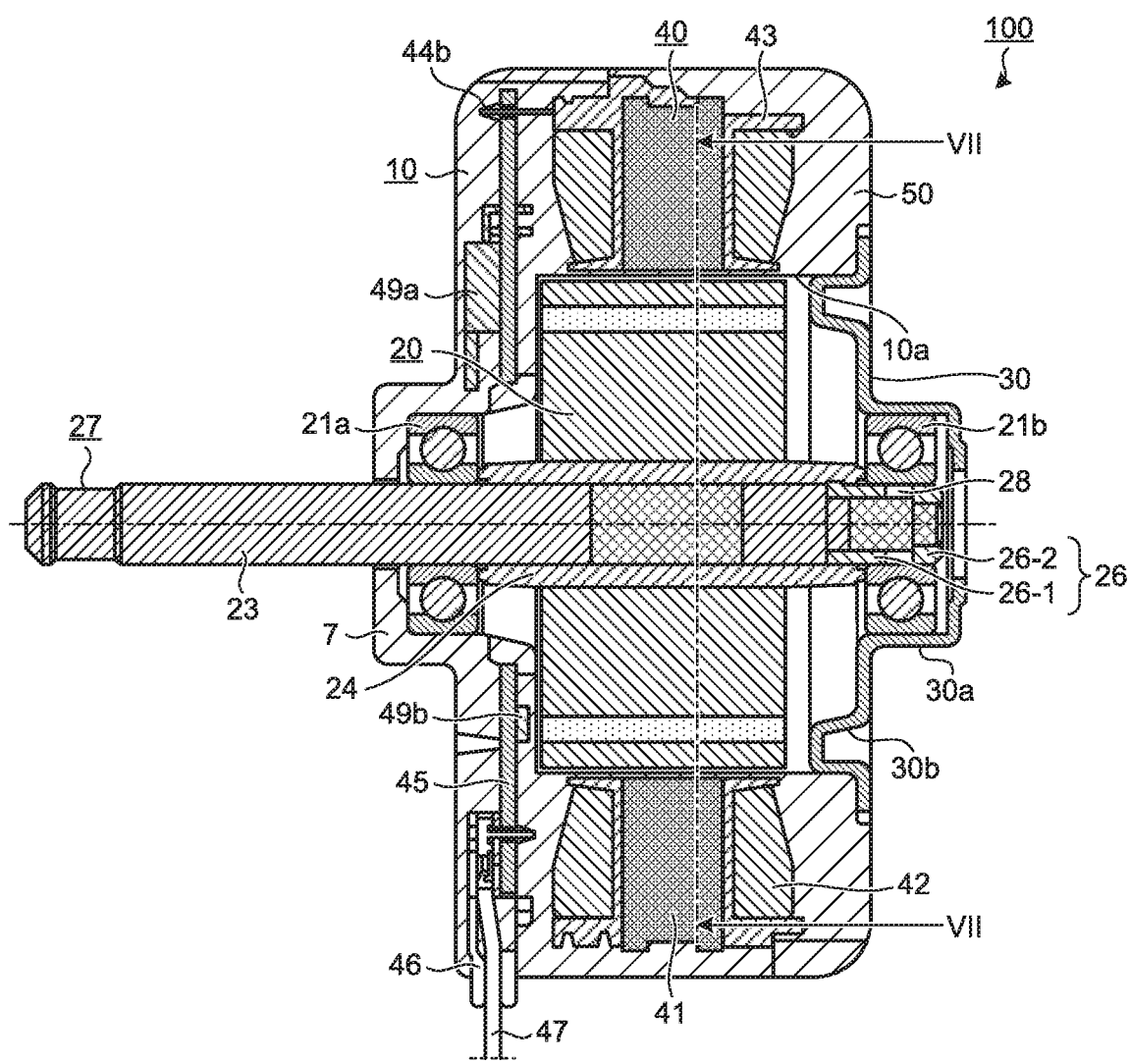
FIG. 1 is a side cross-sectional view of an electric motor according to an embodiment of the present invention.

FIG. 1 is a side cross-sectional view of an electric motor according to an embodiment of the present invention. An electric motor 100 illustrated in FIG. 1 includes a molded stator 10, a rotor 20, and a metal bracket 30 attached to one axial end portion of the molded stator 10. The electric motor 100 is, for example, a brushless DC motor that includes permanent magnets in the rotor 20 and is driven by an inverter. The rotor 20 is of an internal magnet type and is of a consequent pole type.

The molded stator 10 includes a stator 40 and a mold resin 50 covering the stator 40. The axial direction of the molded stator 10 coincides with the axial direction of a shaft 23 of the rotor 20. FIG. 1 illustrates, as components of the stator 40, a stator core 41, a coil 42 wound around the stator core 41, an insulating portion 43 provided at the stator core 41, a neutral terminal 44b provided at the insulating portion 43, a substrate 45 attached to the insulating portion 43, a lead exit part 46 assembled to the substrate 45, a lead 47 exiting from the lead exit part 46, an Integrated Circuit (IC) 49a mounted on the substrate 45, and a hall IC 49b mounted on a surface of the substrate 45 on the side of the rotor 20, details of which will be described sequentially.

The rotor 20 includes a shaft assembly 27, a resin portion 24 that integrates the rotor 20 body and the shaft assembly 27, a load-side rolling bearing 21a that is mounted on the shaft 23 and supported by a bearing support 7 of the molded stator 10, and an opposite-to-load-side rolling bearing 21b that is mounted on the shaft 23 and supported by the bracket 30. The load side is the sheet left side of the electric motor 100. The opposite-to-load side is the sheet right side of the electric motor 100.

The shaft assembly 27 includes, for example, an insulating sleeve 26 consisting of a pair of insulating sleeves 26-1 and 26-2. The insulating sleeve 26 is disposed between the opposite-to-load-side rolling bearing 21b and the shaft 23.

Figure 2:
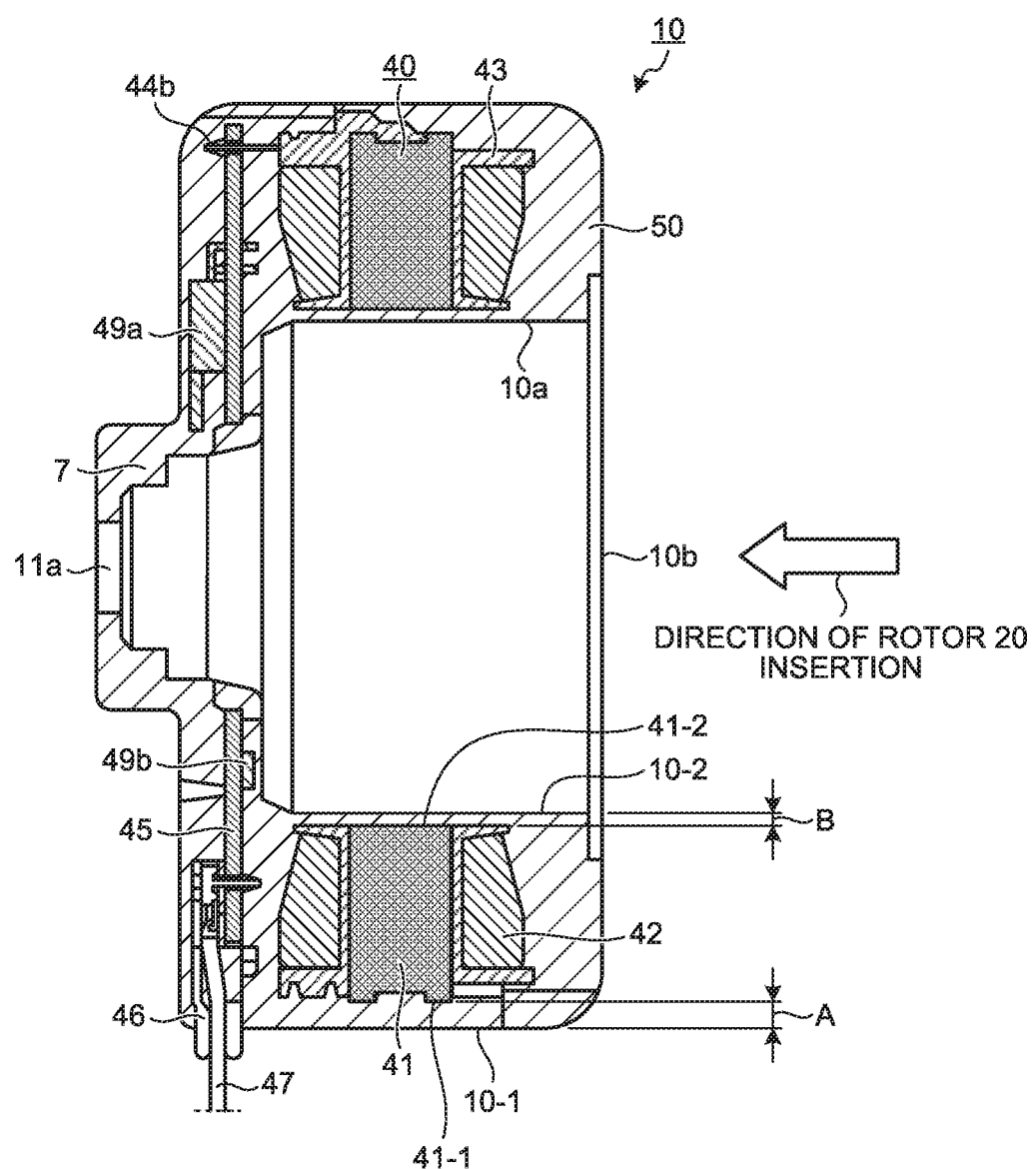
FIG. 2 is a side cross-sectional view of a molded stator illustrated in FIG. 1.

FIG. 2 is a side cross-sectional view of the molded stator illustrated in FIG. 1. In FIG. 2, the same reference numerals are assigned to the same components as those in FIG. 1. In the molded stator 10, an opening 10b is formed in one axial end portion of the molded stator 10, and the rotor 20 is inserted into the opening 10b. The one axial end portion is an end portion on the sheet right side of the molded stator 10. In the other axial end portion of the molded stator 10, a hole 11a larger than the diameter of the shaft assembly 27 of the rotor 20 illustrated in FIG. 1 is formed. The other axial end portion is an end portion on the sheet left side of the molded stator 10. The other configuration of the molded stator 10 will be described later.

Figure 3:
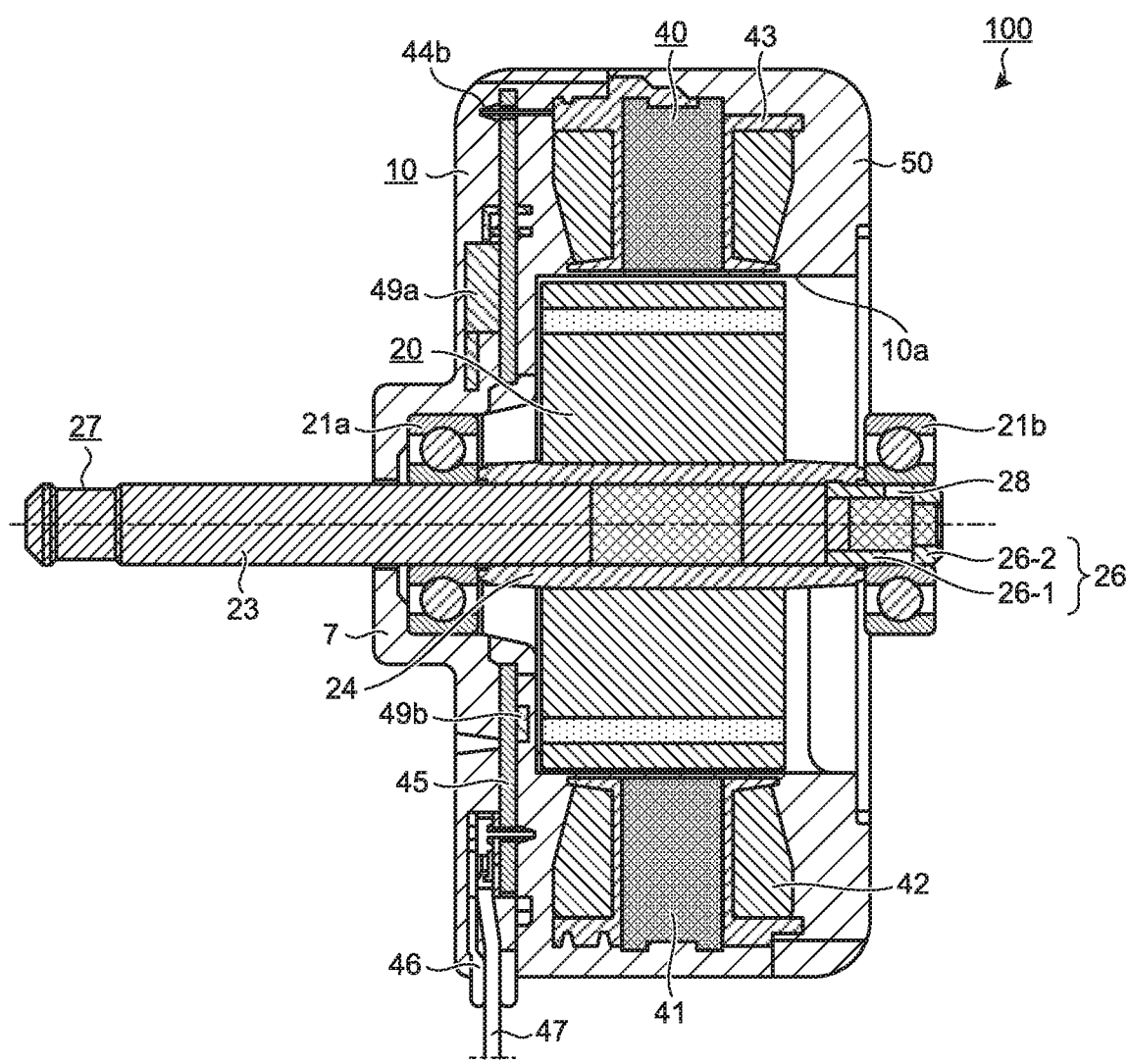
FIG. 3 is a side cross-sectional view illustrating a state in which a rotor is inserted in the molded stator illustrated in FIG. 2.

FIG. 3 is a side cross-sectional view illustrating a state in which the rotor is inserted in the molded stator illustrated in FIG. 2. In FIG. 3, the same reference numerals are assigned to the same components as those in FIG. 1. The rotor 20 inserted through the opening 10b of the molded stator 10 illustrated in FIG. 2 is disposed such that the load side of the shaft assembly 27 is drawn out to the outside of the molded stator 10 through the hole 11a illustrated in FIG. 2. At this time, the load-side rolling bearing 21a mounted on the shaft 23 is pressed until the load-side rolling bearing 21a abuts on the bearing support 7 of the molded stator 10, and is supported by the bearing support 7. The bearing support 7 is an axial end portion of the molded stator 10, and is provided opposite to the opening 10b.

On the opposite-to-load side of the shaft assembly 27, the opposite-to-load-side rolling bearing 21b is mounted. The mounting of the opposite-to-load-side rolling bearing 21b is generally by press fitting. The insulating sleeve 26 integrally molded with and formed on the shaft 23 is provided between the opposite-to-load-side rolling bearing 21b and the opposite-to-load side of the shaft 23, which will be described in detail later. A cavity 28 is provided between the insulating sleeve 26-1 and the insulating sleeve 26-2 constituting the insulating sleeve 26.

Figure 4:
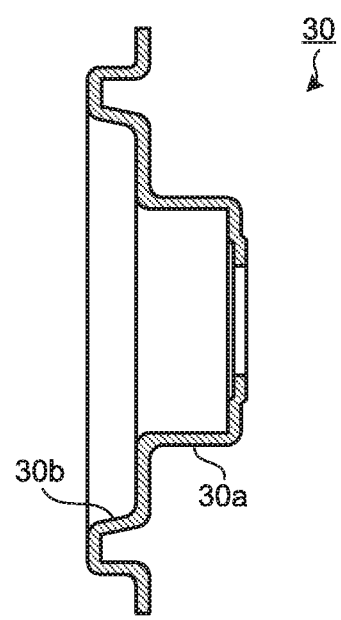
FIG. 4 is a side cross-sectional view of a bracket illustrated in FIG. 1.

FIG. 4 is a side cross-sectional view of the bracket illustrated in FIG. 1. The bracket 30 closes the opening 10b of the molded stator 10 and supports the opposite-to-load-side rolling bearing 21b, and is press-fitted into the molded stator 10. The bracket 30 includes a bearing support 30a and a press-fitted portion 30b integrally formed with the bearing support 30a. The bearing support 30a supports the opposite-to-load-side rolling bearing 21b. The press-fitted portion 30b has a ring shape, and its cross section is U-shaped.

The attachment of the bracket 30 to the molded stator 10 is performed by press-fitting the press-fitted portion 30b into the opening 10b side of an inner peripheral portion 10a of the molded stator 10. The outer diameter of the press-fitted portion 30b is larger than the inner diameter of the inner peripheral portion 10a of the molded stator 10 by a margin for press fitting. The bracket 30 is made of a metal having conductivity, and is formed of, for example, a galvanized steel sheet. However, the bracket 30 can also be formed of a material other than a galvanized steel sheet. The material of the bracket 30 can be exemplified by an aluminum alloy, an austenitic stainless alloy, a copper alloy, cast iron, steel, or an iron alloy.

The configuration of the molded stator 10 will be described below. The molded stator 10 illustrated in FIG. 2 includes the stator 40 and the mold resin 50 for molding. An unsaturated polyester resin is used for the mold resin 50. Bulk Molding Compound (BMC) with various additives added to an unsaturated polyester resin is particularly desirable for an electric motor. For example, thermoplastic resins such as PolyButylene Terephthalate (PBT) and Poly Phenylene Sulfide (PPS) have a better side because runners during molding can be recycled.

However, unsaturated polyester resins and BMC excel in providing dimensional accuracy because the unsaturated polyester resins and BMC have linear expansion coefficients close to linear expansion coefficients of iron-based materials such as the stator core 41, the load-side rolling bearing 21a, and the opposite-to-load-side rolling bearing 21b, and have heat shrinkage percentages of 1/10 or less of heat shrinkage percentages of thermoplastic resins.

In addition, as compared with the case where an outer shell of the electric motor 100 is formed of a metal such as iron or aluminum, an outer shell of the electric motor 100 formed of an unsaturated polyester resin and BMC has better heat dispersion characteristics. In addition, when an outer shell of the electric motor 100 is formed of a metal, the metal forming the outer shell of the electric motor 100 is separated from the coil 42 and the substrate 45 due to insulation problem. By contrast, the unsaturated polyester resin and BMC are insulators and thus present no insulation problem even when covering the coil 42 and the substrate 45, and have high thermal conductivities and thus have excellent heat dispersion characteristics, contributing to higher output power of the electric motor 100.

The load-side rolling bearing 21a is supported by the bearing support 7 formed of the mold resin 50, and the opposite-to-load-side rolling bearing 21b and the bracket 30 are supported by the inner peripheral portion 10a formed of the mold resin 50. Therefore, if the dimensional accuracy of the mold resin 50 is poor, the axis of the rotor 20 and the axis of the stator 40 are misaligned, causing vibration and noise. However, using the unsaturated polyester resin and BMC having small heat shrinkage percentages facilitates the provision of dimensional accuracy after molding.

In addition, using a resin having a large linear expansion coefficient may cause a problem that the bearings rattle when the temperature of the electric motor 100 becomes high. The unsaturated polyester resin and BMC, whose linear expansion coefficients are close to the linear expansion coefficients of iron-based materials such as the stator core 41, the load-side rolling bearing 21a, and the opposite-to-load-side rolling bearing 21b, thus can prevent misalignment between the axis of the rotor 20 and the axis of the stator 40, irrespective of the temperature of the electric motor 100.

Further, the unsaturated polyester resin and BMC constrain the stator 40 when cured, and thus can prevent deformation of the stator 40 due to the exciting force of the electric motor 100, and can suppress vibration and noise.

Figure 5:
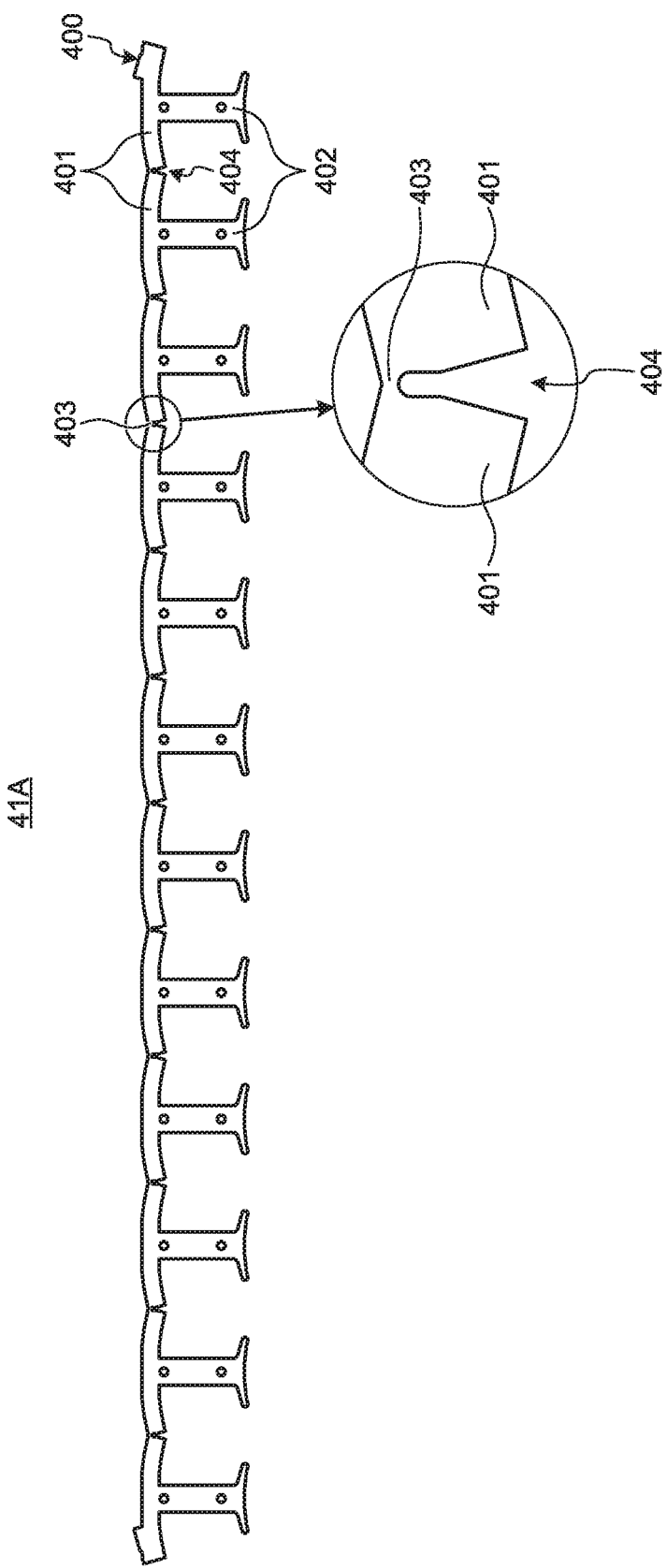
FIG. 5 is a configuration diagram of a stator core composed of a plurality of core segments and developed in a strip.

FIG. 5 is a configuration diagram of the stator core composed of a plurality of core segments and developed in a strip. A stator core 41A illustrated in FIG. 5 is the stator core illustrated in FIG. 1 composed of a plurality of core segments 400. The stator core 41A is formed with the plurality of core segments 400 each having a back yoke 401 and a tooth 402 projecting from the back yoke 401 is arrayed such that each of the plurality of core segments 400 is in contact with another adjacent one of the plurality of core segments 400. Thin-walled portions 403 connecting the adjacent back yokes 401 are provided between the back yokes 401.

Figure 6:
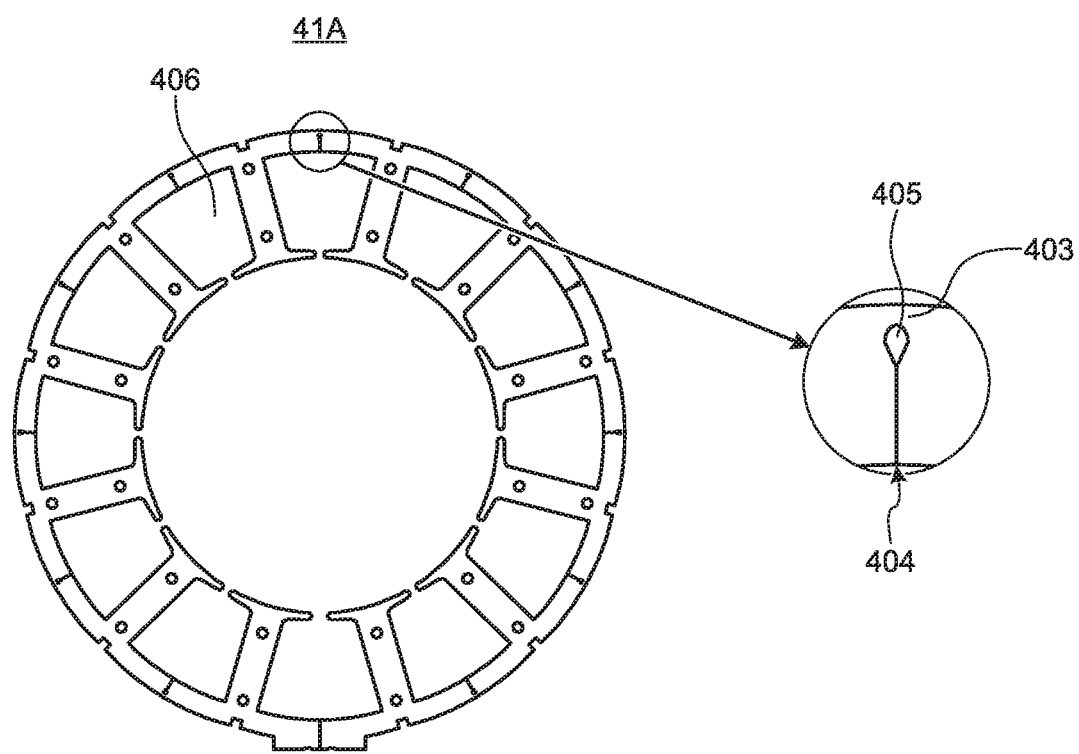
FIG. 6 is a diagram illustrating a state in which the developed stator core illustrated in FIG. 5 is bent into an annular shape.

FIG. 6 is a diagram illustrating a state in which the developed stator core illustrated in FIG. 5 is bent into an annular shape. The annular stator core 41A illustrated in FIG. 6 is formed by providing the coil 42 in FIG. 1 to each of the plurality of teeth 402 illustrated in FIG. 5, and then bending a core segment 400 group in a strip at the thin-walled portions 403 into an annular shape.

As illustrated in FIGS. 5 and 6, the stator core 41A composed of the plurality of core segments 400 allows the coil 42 to be wound thereon in a state of being developed in a strip, and thus enables densification of the coil 42 and is effective for increased efficiency. However, since the core segments 400 are connected by the thin-walled portions 403, the stator core 41A has a low rigidity when formed in an annular shape. For those having large exciting force like the consequent-pole-type electric motor 100, it is effective to mold the stator core 41A with an unsaturated polyester resin, that is, cover the stator core 41A with an unsaturated polyester resin.

Other than the structure in which the adjacent back yokes 401 are connected to each other by the thin-walled portions 403 as in FIG. 5, the stator core 41A composed of the plurality of core segments 400 may be of a structure in which dowels in recessed and projecting shapes are formed at end portions of each back yoke 401, and the dowels are connected to each other, or may be of a structure in which the back yokes 401 separated from each other are fixed by welding or fitting together. By covering the stator core thus configured with an unsaturated polyester resin, vibration and noise can be reduced.

It is desirable to completely cover the stator core with an unsaturated polyester resin in this manner. As illustrated in FIG. 2, it is desirable that the molded stator 10 is configured to satisfy a relationship of A>B where A is the thickness from an outer peripheral portion 41-1 of the stator core 41 to an outer peripheral portion 10-1 of the unsaturated polyester resin, and B is the thickness from an inner peripheral portion 41-2 of the stator core 41 to an inner peripheral portion 10-2 of the unsaturated polyester resin.

If the thickness B is made too large, the diameter of the rotor 20 must be reduced, and the magnetic gap between the stator core 41 and the rotor 20 becomes large, degrading electric motor characteristics. Therefore, in the molded stator 10 according to the present embodiment, by making the thickness A larger than the thickness B, the rigidity of the thickness A on the radially outer side is increased.

If the axis of the rotor 20 and the axis of the stator 40 are misaligned, causing imbalance in the gap between the stator core 41 and the rotor 20, an exciting force due to eccentricity is added. Therefore, eccentricity should be minimized as much as possible in assemblage. As the thickness B increases, a corresponding imbalance tends to occur in the gap. Thus, it is effective to set the thickness B to zero. However, in that case, spaces between the adjacent teeth of the stator core 41 are filled with the unsaturated polyester resin up to the teeth tips. Exciting force includes a force shaking the teeth tips to the left and right. Thus, completely filling the spaces between the teeth leads to the reduction of the influence of this force.

For the stator core 41A illustrated in FIGS. 5 and 6, by providing the unsaturated polyester resin to split surfaces 404 between the adjacent core segments 400, the influence of exciting force acting on the teeth 402 can be reduced. Therefore, in the stator core 41A, holes 405 are formed in the split surfaces 404 of the annular stator core 41A illustrated in FIG. 6.

Each hole 405 is formed by providing a groove or a notch between the adjacent back yokes 401. When unsaturated polyester is molded on the annular stator core 41A, the holes 405 are filled with unsaturated polyester. The holes 405 need not be filled with unsaturated polyester in the entire area from one axial end face to the other axial end face of the stator core 41A, and only need to be filled slightly from one axial end face of the stator core 41. In this case also, an effect of attenuating vibration can be expected. As the holes 405 are made larger in order to increase the filling amount, the holes 405 have magnetically more adverse effects. Therefore, the filling amount is determined appropriately. The holes 405 in the split surfaces 404 may have a groove shape open to the outer peripheral surface of the stator core 41A, or a groove shape open to the slot 406 side, to provide the same effect.

Figure 7:
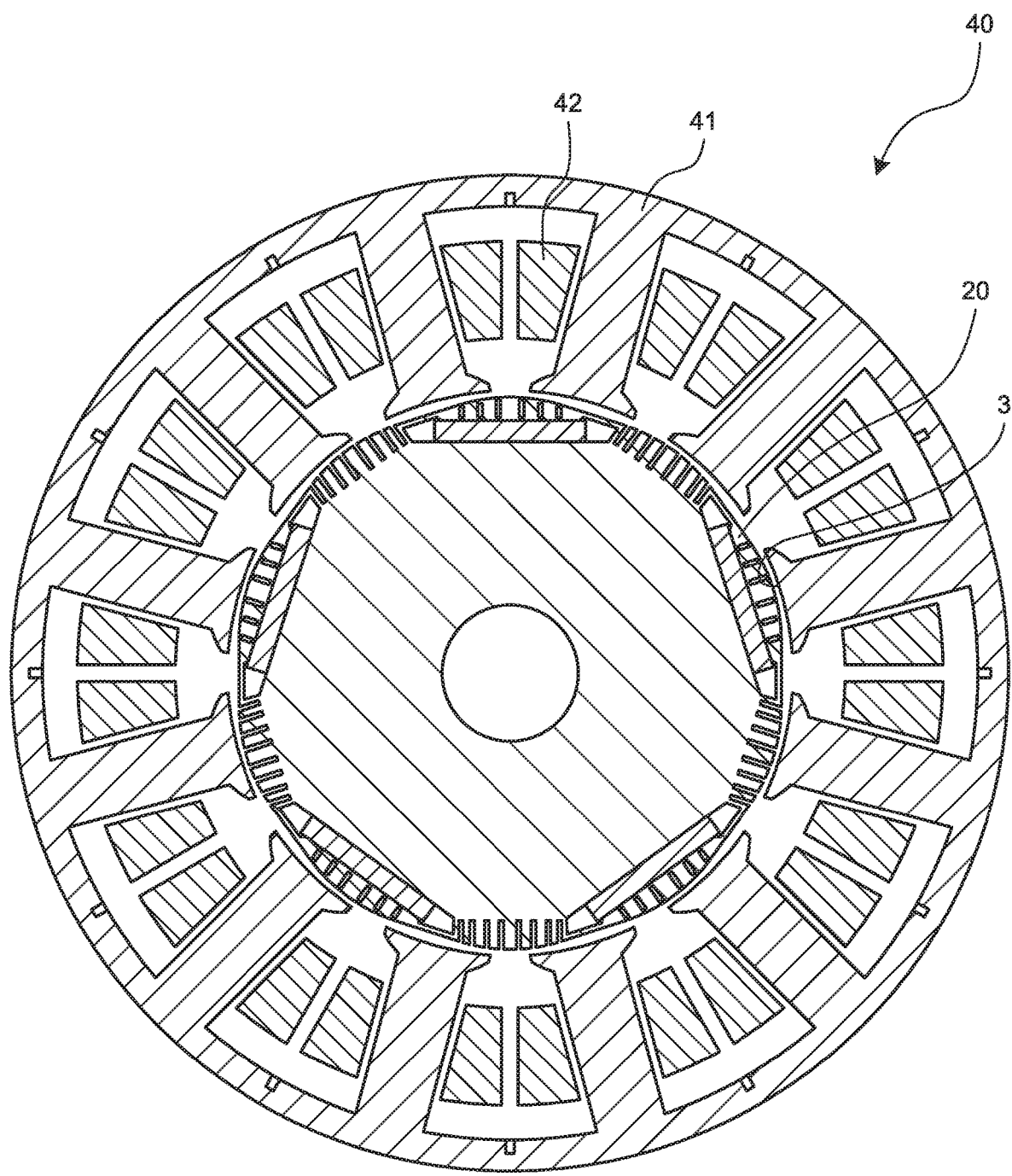
FIG. 7 is a VII-VII cross-sectional view of the stator core and the rotor before being provided with a mold resin illustrated in FIG. 1.
Figure 8:
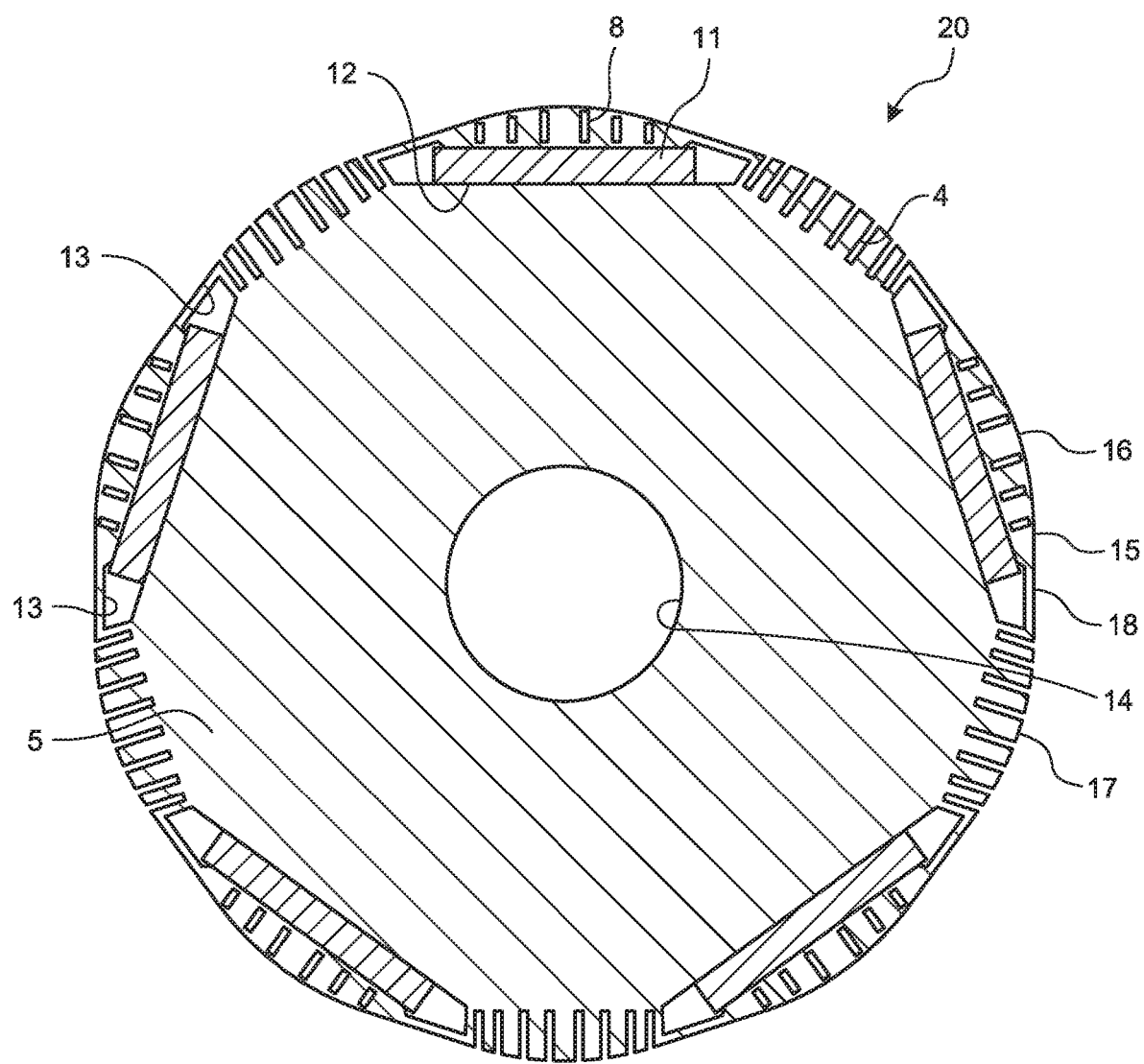
FIG. 8 is an enlarged view of the rotor illustrated in FIG. 7.
Figure 9:
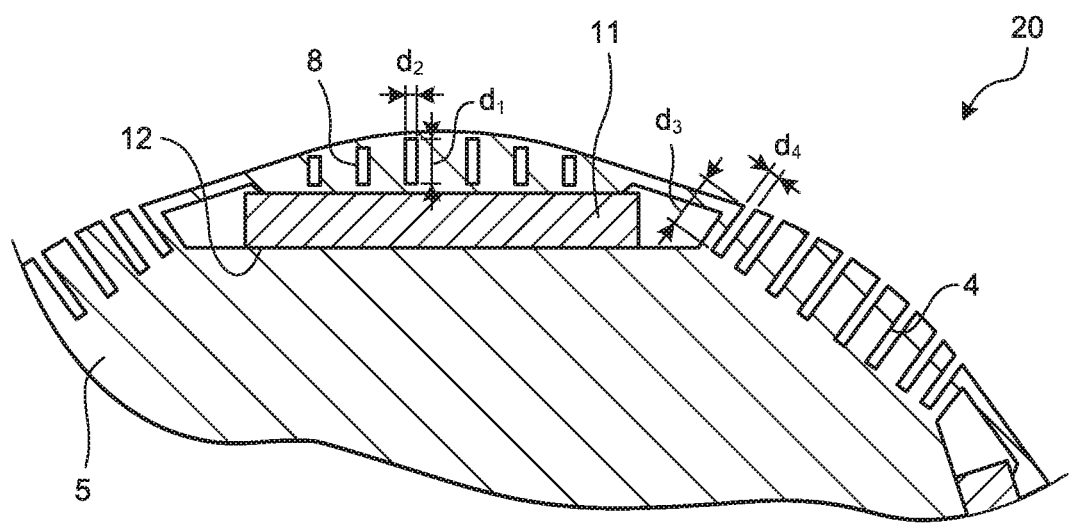
FIG. 9 is a partially enlarged view of the rotor illustrated in FIG. 8.
Figure 10:
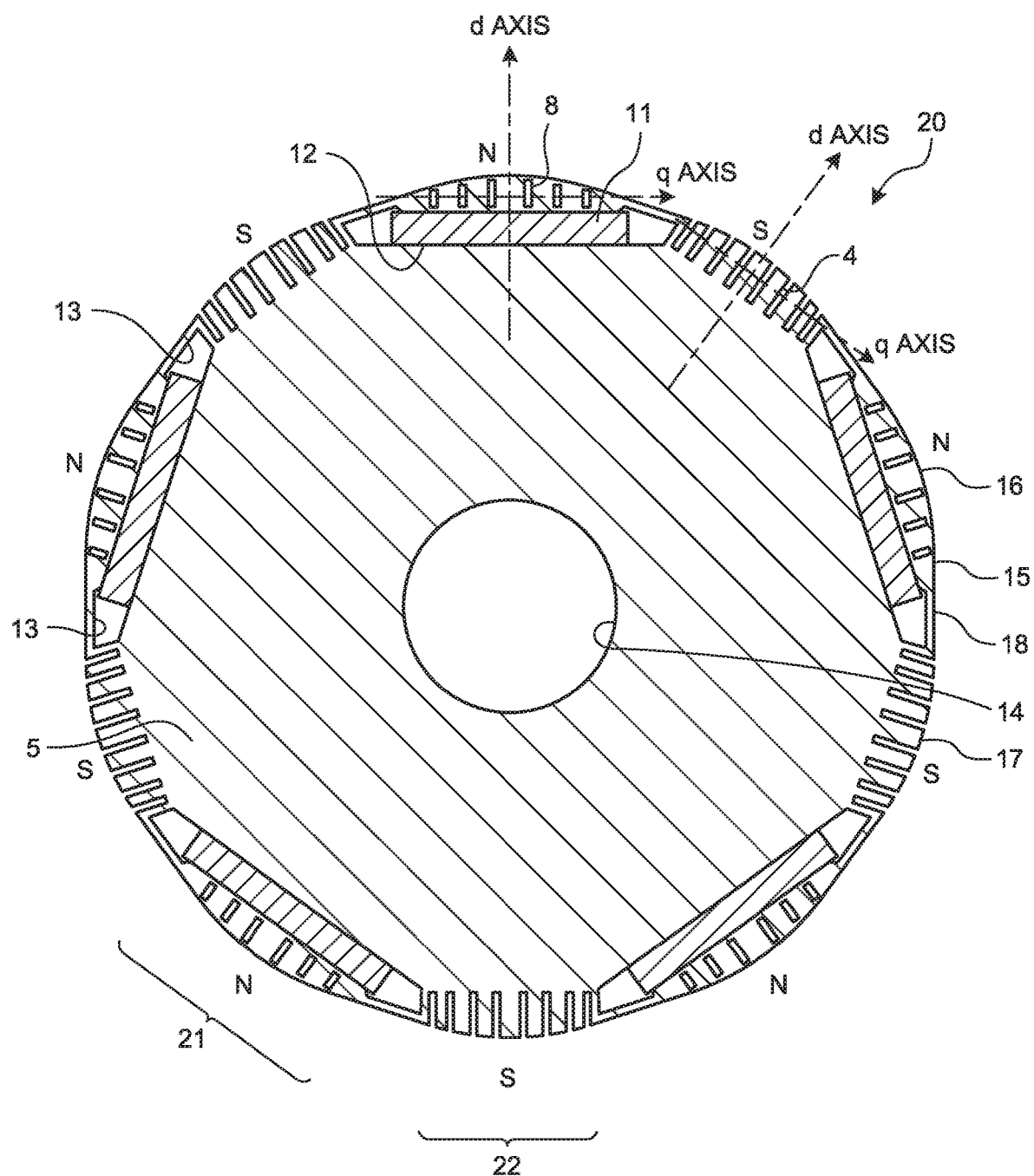
FIG. 10 is a cross-sectional view for explaining magnetic poles of the rotor illustrated in FIG. 7.

Next, the configuration of the rotor 20 will be described. FIG. 7 is a VII-VII cross-sectional view of the stator core and the rotor before being provided with the mold resin illustrated in FIG. 1. FIG. 8 is an enlarged view of the rotor illustrated in FIG. 7. FIG. 9 is a partially enlarged view of the rotor illustrated in FIG. 8. FIG. 10 is a cross-sectional view for explaining magnetic poles of the rotor illustrated in FIG. 7.

The rotor 20 includes an annular rotor core 5 and five permanent magnets 11 disposed inside the rotor core 5.

The rotor core 5 has five magnet holes 12 arrayed in a circumferential direction. The number of the magnet holes 12 is half the number of the poles of the rotor 20. Here, the circumferential direction is the circumferential direction of the rotor core 5. The five magnet holes 12 are arrayed at equal intervals in the circumferential direction. The five magnet holes 12 are arranged equidistantly from the rotation axis. Here, the rotation axis coincides with the axis of the rotor core 5. The five magnet holes 12 extend in the axial direction of the rotor core 5, passing through the rotor core 5. The magnet holes 12 are formed in an outer peripheral edge portion of the rotor core 5, and extend in the circumferential direction. The adjacent magnet holes 12 are separated from each other. The rotor core 5 has at the center portion a shaft hole 14 into which the shaft is inserted.

The rotor core 5 is made of a core material that is a soft magnetic material, specifically, is formed by stacking a plurality of electromagnetic steel sheets. The thickness of the electromagnetic steel sheets is generally from 0.1 mm to 0.7 mm.

The five permanent magnets 11 are inserted into the five respective magnet holes 12. The permanent magnets 11 have a flat-plate shape with a rectangular cross section, for example. The thickness of each permanent magnet 11 is 2 mm, for example.

The permanent magnets 11 are rare earth magnets, and are neodymium sintered magnets whose main component is neodymium (Nd)-iron (Fe)-boron (B).

In each of both end portions of each magnet hole 12, a flux barrier portion 13 as a cavity is formed with the permanent magnet 11 disposed in the magnet hole 12. That is, both circumferential end faces of each permanent magnet 11 abut on the two flux barrier portions 13 each formed of an air layer. The flux barrier portions 13 have the function of making the magnetic flux density distribution over the outer peripheral surface of the rotor 20 close to a sinusoidal wave to short-circuit magnetic flux of the adjacent permanent magnets 11 via the rotor core 5, that is, to prevent flux leakage.

The rotor 20 has ten magnetic poles arrayed such that the polarities alternate at the outer peripheral surface of the rotor core 5 in the circumferential direction. Specifically, the rotor 20 has five first magnetic poles that are formed by the five respective permanent magnets 11 and have the same polarity, and five second magnetic poles each of which is formed in the rotor core 5 between the permanent magnets 11 adjacent to each other and has a polarity different from that of the first magnetic poles. In the illustrated example, the first magnetic poles are N poles and the second magnetic poles are S poles, but the poles may be reversed. The ten magnetic poles of the rotor 20 are arranged at equal angular intervals in the circumferential direction with a pole pitch of 360 degrees/10=36 degrees.

Thus, the rotor 20 is of a consequent pole type, and the five permanent magnets 11, which are half the number of the poles, provide the five respective first magnetic poles. Further, the five second magnetic poles, which are half the number of the poles, are each formed in the core material of the rotor core 5 between the permanent magnets 11 adjacent to each other. The second magnetic poles are so-called salient poles, and are formed by magnetizing the rotor 20.

Therefore, as illustrated in FIG. 10, in the rotor 20, first magnetic pole portions 21 that are magnet magnetic pole portions including the permanent magnets 11 and have the first magnetic poles, and second magnetic pole portions 22 that are core magnetic pole portions not including the permanent magnets 11 and have the second magnetic poles are arrayed alternately in the circumferential direction of the rotor 20. In the consequent-pole-type rotor 20, the number of poles is an even number of four or more.

The outer shape 15 of the rotor core 5 is a so-called flower circle shape. Here, the flower circle shape is a shape in which the outer diameter of the rotor core 5 is the maximum at pole centers 16 and 17 and is the minimum at inter-pole spaces 18, and is a shape forming an arc from the pole centers 16 and 17 to the inter-pole spaces 18. Here, the pole centers 16 are pole centers of the first magnetic poles, and the pole centers 17 are pole centers of the second magnetic poles. In the illustrated example, the flower circle shape is a shape in which ten petals of the same shape and the same size are arranged at an equal angle. Therefore, the outer diameter of the rotor core 5 at the pole centers 16 is equal to the outer diameter of the rotor core 5 at the pole centers 17. The circumferential width of each magnet hole 12 is larger than the pole pitch.

In the present embodiment, the rotor core 5 has six slits 8 constituting first slits. The six slits 8 are provided inside the rotor core 5 and are disposed on the outer side of each permanent magnet 11, and are provided for each permanent magnet 11. Here, the outer side of the permanent magnets 11 is the outer side in the radial direction of the rotor core 5. That is, the six slits 8 are provided in the rotor core 5 between each permanent magnet 11 and the outer periphery of the rotor core 5.

Each slit 8 has a rectangular shape in cross section, extends in the radial direction, and has a radial width $d_1$ larger than a circumferential width $d_2$ thereof. Here, the radial width is a width in a d-axis direction, and the circumferential width is a width in a direction at right angles to the radial direction, that is, a q-axis direction. However, none of the six slits 8 reaches the outer peripheral surface of the rotor core 5. That is, none of the six slits 8 is open to the outer peripheral surface.

The closer the six slits 8 are to the pole center 16, the longer the slits 8 are radially. The six slits 8 are disposed circumferentially symmetrically around the pole center 16. That is, the closer the slits 8 are to the pole center 16, the larger the widths $d_1$ of the slits 8. The widths $d_2$ of the slits 8 are constant irrespective of the circumferential positions of the slits 8. The six slits 8 extend in the axial direction of the rotor core 5, passing through the rotor core 5.

Furthermore, in the present embodiment, the rotor core 5 has eight slits 4 constituting second slits. The eight slits 4 are provided in the outer peripheral surface of the rotor core 5, and are disposed in a space between the permanent magnets 11 adjacent to each other. The eight slits 4 are provided for each space between the permanent magnets 11 adjacent to each other. Each slit 4 has a rectangular shape in cross section, extends in the radial direction, and has a radial width $d_3$ larger than a circumferential width $d_4$ thereof. Here, the radial width is a width in a d-axis direction, and the circumferential width is a width in a direction at right angles to the radial direction, that is, a q-axis direction. The slits 4 are grooves open to the outer peripheral surface of the rotor core 5.

The closer the eight slits 4 are to the pole center 17, the longer the slits 4 are radially. The eight slits 4 are arranged circumferentially symmetrically around the pole center 17. That is, the closer the slits 4 are to the pole center 17, the larger the widths $d_3$ of the slits 4. The widths $d_4$ of the slits 4 are constant irrespective of the circumferential positions of the slits 4. The eight slits 4 extend in the axial direction of the rotor core 5, passing through the rotor core 5.

In the illustrated example, the number of the slits 4 between the permanent magnets 11 is larger than the number of the slits 8 on the outer side of the permanent magnet 11. Also, a minimum value of $d_3$ is larger than a maximum value of $d_1$. That is, the width $d_1$ of the slit 8 closest to the pole center 16 is narrower than the width $d_3$ of the slit 4 closest to the inter-pole space 18. The width $d_2$ is equal to the width $d_4$. Therefore, the total area of the slits 4 between the permanent magnets 11 is larger than the total area of the slits 8 on the outer side of the permanent magnet 11. Here, the total area is cross-sectional areas of cross sections perpendicular to the rotation axis.

The electric motor 100 is driven at variable speed under PWM control by an inverter of a drive circuit not illustrated. The switching carrier of the inverter is generally selected from a range of 4 kHz to 22 kHz for a compressor electric motor or a fan electric motor of an air conditioner. In a consequent-pole-type electric motor in which magnets are embedded in the rotor core 5, the volume of the rotor core 5 is increased, so that magnetic flux due to stator current tends to flow through the rotor core 5, and the motor is susceptible to the effects of harmonics of the current. Also, noise of components of the inverter switching carrier may become a problem. Thus, the carrier frequency is set to 10 kHz or more to have noise frequency components easily insulated, and thereby to reduce influence on the product.

Next, the operation and effect of the present embodiment will be described in comparison with comparative examples. Generally, in a consequent-pole-type rotor, magnetic imbalance is large between magnet magnetic poles provided by permanent magnets and salient poles not provided by permanent magnets. That is, at the magnet magnetic poles, the volume of the core material is relatively small due to the presence of the permanent magnets, so that the inductance at the magnet magnetic poles is smaller than the inductance at the salient poles, causing magnetic imbalance. This inductance imbalance leads to imbalance in magnetic flux. As a result, the magnetic flux density distribution over the rotor surface is not sinusoidal, causing a problem that vibration and noise become large. The vibration includes vibration in the rotational direction and vibration in the radial direction.

The radial vibration is caused by imbalance in attraction force between the stator and the rotor when magnetic flux generated by current flowing through the stator passes through the stator core and the rotor core. In the following description, magnetic flux generated by current is sometimes referred to as current magnetic flux as distinguished from magnet magnetic flux that is magnetic flux generated by magnets. Current magnetic flux flows from the stator core to the rotor core through the gap, and this magnetic flux generates attraction force between the stator and the rotor. At this time, if ease of flow of the magnetic flux at each magnetic pole, that is, inductance balance is achieved, the attraction force between the stator and the rotor can be balanced, so that the rotor as a whole does not generate radial exciting force.

However, in a consequent-pole-type rotor, generally, at magnet magnetic poles, current magnetic flux mainly flows through rotor core portions on the outer side of permanent magnets, whereas at salient poles, where core portions are relatively large since there are no permanent magnets, current magnetic flux tends to flow throughout salient pole portions. This causes imbalance.

Particularly, in a slot combination in which the pitch between stator teeth and rotor magnetic poles differs in the rotation direction, such as ten poles and twelve slots, eight poles and nine slots, or ten poles and nine slots, this imbalance is a more prominent problem. In a slot combination of a two-to-three system, such as eight poles and twelve slots or six poles and nine slots, this problem will be smaller. However, when there is a manufacturing error such as when a rotor is eccentric or the roundness of a rotor is low, the problem of this imbalance is still large.

Figure 11:
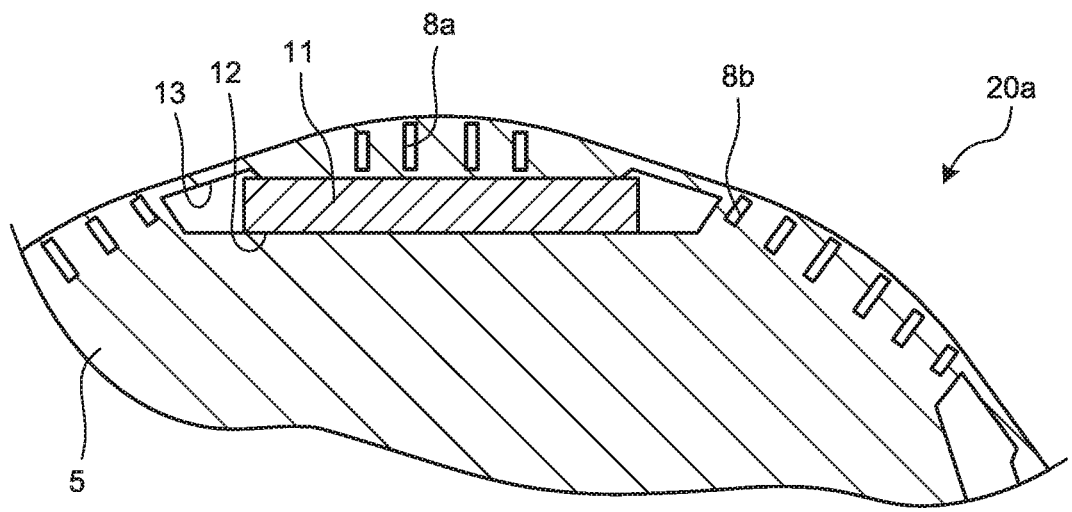
FIG. 11 is a diagram illustrating a first comparative example for the rotor according to the embodiment of the present invention.
Figure 12:
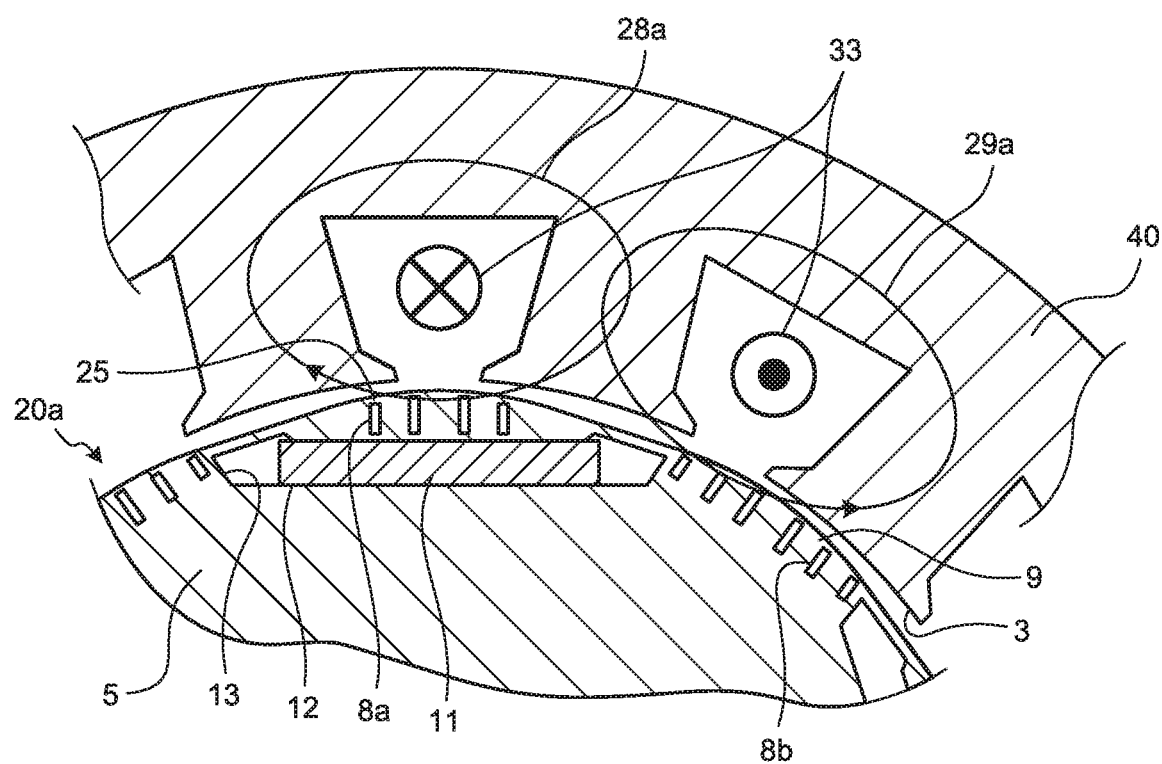
FIG. 12 is a partially enlarged view of an electric motor including a rotor in the first comparative example.

Therefore, as illustrated in FIGS. 11 and 12, it is conceivable to provide slits in the rotor surface, thereby reducing the inductance imbalance between the magnetic poles.

FIG. 11 is a diagram illustrating a first comparative example for the rotor according to the embodiment of the present invention. FIG. 12 is a partially enlarged view of an electric motor having a rotor in the first comparative example. In FIGS. 11 and 12, the same reference numerals are assigned to the same components as those illustrated in FIG. 10.

As illustrated in FIG. 11, a rotor 20*a* according to the first comparative example includes four slits 8*a* provided inside the rotor core 5 and disposed on the outer side of the permanent magnets 11, and six slits 8*b* provided inside the rotor core 5 and disposed between the permanent magnets 11 adjacent to each other. That is, the rotor 20*a* according to the first comparative example is different from the rotor 20 according to the present embodiment in that the slits 8*b* disposed between the permanent magnets 11 are provided inside the rotor core 5.

Here, since the slits 8*a* and 8*b* have an effect of regulating how magnetic flux flows. Thus, by arranging the slits 8*a* and 8*b* so as to further increase magnetic flux between the permanent magnets 11, the magnetic flux density distribution over the rotor surface can be brought into a state close to a sinusoidal wave. That is, by using the configuration like the rotor 20*a*, it is possible to bring the magnetic flux density distribution over the rotor surface close to a sinusoidal wave and make the pole pitches uniform, to reduce torque ripples that cause vibration and noise.

However, with the configuration like the rotor 20*a*, vibration in the rotational direction can be suppressed, but suppression of vibration in the radial direction is still limited. This is for the reason explained below.

FIG. 12 illustrates currents 33 flowing through the stator 40 and illustrates magnetic fluxes 28*a* and 29*a* generated by the currents 33 and flowing through the rotor core 5. The magnetic flux 28*a* flows through a thin-walled portion 25 between the slits 8*a* and the outer peripheral surface of the rotor 20*a*. Similarly, the magnetic flux 29*a* flows through a thin-walled portion 9 between the slits 8*b* and the outer peripheral surface of the rotor 20*a*. Since the slits 8*b* are not open to the outer peripheral surface of the rotor core 5, unlike the slits 4 in the present embodiment, the magnetic flux 29*a* flows through the thin-walled portion 9. Thus, there is a limit to sufficient reduction of the inductance at the salient poles.

If the area of the slits 8*b* is increased, it is possible to reduce the inductance so as to compensate for the magnetic flux flowing through the thin-walled portion 9. In this case, the slits 8*b* impart magnetic resistance to magnet magnetic flux, leading to a decrease in magnet magnetic flux and a reduction in electric motor efficiency. Magnet magnetic flux is magnetic flux generated by the permanent magnets 11.

Figure 13:
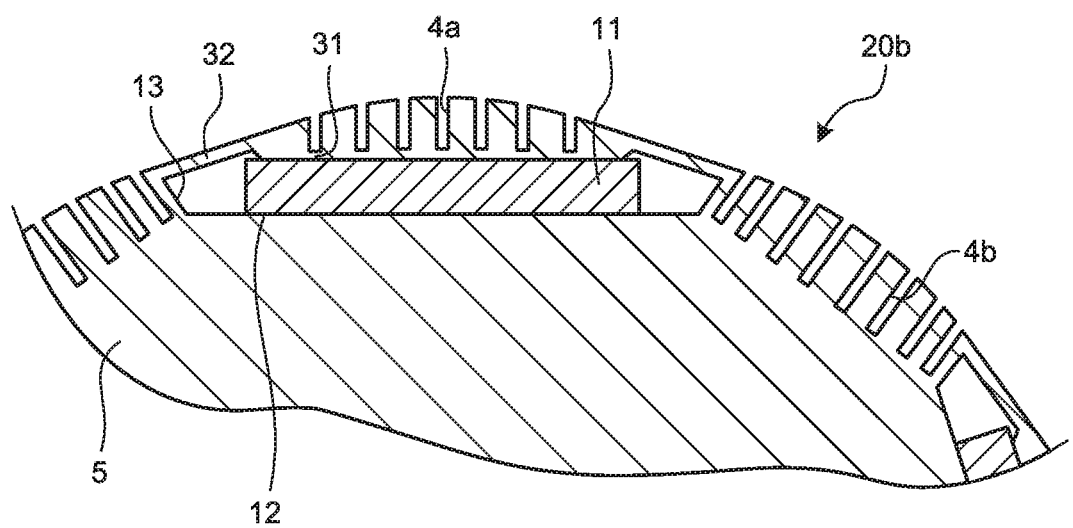
FIG. 13 is a partially enlarged view illustrating the configuration of a rotor in a second comparative example for the rotor according to the embodiment of the present invention.

Therefore, as illustrated in FIG. 13, it is conceivable to provide slits open to the rotor surface, thereby to reduce the inductance imbalance between the magnetic poles.

FIG. 13 is a partially enlarged view illustrating the configuration of a rotor in a second comparative example for the rotor according to the embodiment of the present invention. In FIG. 13, the same reference numerals are assigned to the same components as those illustrated in FIG. 11.

As illustrated in FIG. 13, a rotor 20*b* according to the second comparative example includes seven slits 4*a* provided in the outer peripheral surface of the rotor core 5 and disposed on the outer side of the permanent magnet 11, and eight slits 4*b* provided in the outer peripheral surface of the rotor core 5 and disposed between the permanent magnets 11 adjacent to each other in the circumferential direction. That is, the rotor 20*b* according to the second comparative example is different from the rotor 20 according to the present embodiment in that the slits 4*a* disposed on the outer side of the permanent magnet 11 are provided in the outer peripheral surface of the rotor core 5.

However, the slits 4*a* that are open to the outer peripheral surface of the rotor core 5 and communicate with the gap 3 weaken the strength of the rotor 20*b* against centrifugal force during rotation. Specifically, at the magnet magnetic poles, centrifugal force exerted on the core portions on the outer side of the permanent magnets 11 and the permanent magnets 11 by the rotation of the rotor 20*b* produces stress on thin-walled bridges 32 between the outer peripheral surface of the rotor core 5 and the flux barrier portions 13. When the slits 4*a* are provided, bending moments are produced on thin-walled bridges 31 between the magnet holes 12 and the slits 4*a*, and the thin-walled bridges 32 become still weaker in strength.

If the radial width of the thin-walled bridges 32 is increased in order to increase centrifugal force resistance, the leakage of magnet magnetic flux increases, leading to a decrease in magnetic flux and a reduction in electric motor efficiency. If the radial width of the thin-walled bridges 31 is increased, current magnetic flux flows more easily and tends to cause imbalance in magnetic flux.

At the salient poles, centrifugal force due to the rotation of the rotor 20*b* can be received by the entire core portions, and thus the salient poles have high strength and can provide centrifugal force resistance even if the slits 4*b* are open to the outer peripheral surface of the rotor 20*b*.

By contrast, in the present embodiment, at the second magnetic poles constituting salient poles, the slits 4 are provided in the outer peripheral surface of the rotor core 5, thereby reducing the inductance greatly, and at the first poles constituting magnet magnetic poles, the slits 8 are provided inside the rotor core 5, thereby lowering the inductance slightly. As a result, the inductance difference between the first magnetic poles and the second magnetic poles is smaller than that in the first comparative example.

Further, in the present embodiment, the slits 8 on the outer side of the permanent magnets 11 are not open to the outer peripheral surface of the rotor core 5, thus not causing the problem of centrifugal force resistance as in the second comparative example. Since the thin-walled bridges 32 and 31 as illustrated in FIG. 7 do not exist between the permanent magnets 11, centrifugal force does not matter. The provision of the slits 4 open to the outer peripheral surface of the rotor core 5 does not impair the centrifugal force resistance.

The slits 4 and 8 are desirably provided not to impart magnetic resistance to magnet magnetic flux but to impart magnetic resistance to current magnetic flux. That is, the slits 4 and 8 are disposed to be parallel to magnet magnetic flux, that is, to be elongated in the d-axis direction, and on the other hand, are disposed as long as possible to impart magnetic resistance in the q-axis direction at right angles to the d-axis. The magnetic resistance in the q-axis direction reduces the q-axis inductance. This makes it harder for current magnetic flux to flow through the rotor core 5, and can reduce the imbalance in the q-axis inductance that is a main factor for vibration and noise. Further, since the slits 4 and 8 are provided so as not to impart magnetic resistance in the d-axis direction, it is possible to prevent a decrease in the magnetic force of the permanent magnets 11. The sizes of the slits 4 and 8 are appropriately set based on magnetic balance, strength, and productivity by die pressing.

In the present embodiment, the total area of the slits 4 between the permanent magnets 11 adjacent to each other is larger than the total area of the slits 8 on the outer side of each permanent magnet 11 in the radial direction of the rotor core 5. As a result, it is possible to further reduce the inductance imbalance between the first magnetic poles and the second magnetic poles. The total area of the slits 8 and the total area of the slits 4 are appropriately set by taking into consideration magnetic balance, strength, and productivity by die pressing.

In order to make the total area of the slits 4 larger than the total area of the slits 8, the number of the slits 4 may be made larger than the number of the slits 8, or the radial widths of the slits 4 may be made larger than the radial widths of the slits 8, or the width of the slits 4 in a direction at right angles to the radial direction may be made larger than the width of the slits 8 in a direction at right angles to the radial direction.

In the present embodiment, the six slits 8 are provided for each permanent magnet 11, and the eight slits 4 are provided for each space between the permanent magnets 11, but the number of the slits 8 and the number of the slits 4 are not limited to six and eight. The number of the slits 8 and the number of the slits 4 are appropriately set, based on magnetic balance, strength, and productivity by die pressing.

When only inductance balance is taken into consideration, it is effective not to provide the slits 8 in the first magnetic pole portions 21 including the permanent magnets 11. However, by making current magnetic flux hard to flow by the slits 8, armature reaction disturbing magnet magnetic flux can be reduced to prevent vibration and noise due to higher-order components of magnetic flux in disturbed magnetic flux. Therefore, it is preferable to provide the slits 8 also in the first magnetic pole portions 21 including the permanent magnets 11. That is, the number of the slits 8 for each permanent magnet 11 and the number of the slits 4 for each space between the permanent magnets 11 can each be set to at least one.

In the present embodiment, the outer shape 15 of the rotor core 5 is a flower circle shape, and the circumferential width of each magnet hole 12 is made larger than the pole pitch. As a result, the surface magnetic flux density distribution on the rotor 20 can be brought closer to a sinusoidal waveform, to further suppress vibration and noise in the rotational direction.

Further, in the present embodiment, the outer diameter of the rotor core 5 at the pole centers 16 is equal to the outer diameter of the rotor core 5 at the pole centers 17. In order to reduce the inductance imbalance, there is a way to make the outer diameter of the rotor core 5 at the pole centers 17 smaller than the outer diameter of the rotor core 5 at the pole centers 16, thereby to increase the length of the gap 3 at the pole centers 17. However, in the present embodiment, the inductance imbalance can be reduced without setting the gap 3 non-uniformly between the first magnetic poles and the second magnetic poles.

If the gap 3 is non-uniform between the first magnetic poles and the second magnetic poles, it is necessary to use a jig for holding the rotor 20 not in a circular shape but in conformance with steps of the outer diameter during the manufacturing of the electric motor. In addition, to check the gap 3 with a gap gauge, it is necessary to use different gap gauges for the first magnetic poles and the second magnetic poles, causing increased working steps.

Generally, from the viewpoint of higher efficiency, for compressor electric motors or fan electric motors of air conditioners, neodymium sintered magnets with Nd—Fe—B as a main component, having a stronger magnetic force have come to be used in place of ferrite sintered magnets, ferrite bonded magnets, or bonded magnets with samarium (Sm)—Fe—B as a main component.

However, rare-earth elements of Nd used in neodymium sintered magnets, and dysprosium (Dy) and terbium (Tb) added to neodymium sintered magnets in order to improve coercive force are expensive and unstable in procurement. Thus, it is required to reduce the usage amount and processing cost of the permanent magnets 11.

The permanent magnets 11 are generally made by cutting a block into a specified shape. Therefore, as the permanent magnets 11 become thinner and smaller, the material yield decreases and the productivity decreases. Therefore, as the number of the permanent magnets 11 used per electric motor 100 increases, the manufacturing cost becomes higher by the magnet processing cost.

Therefore, in order to reduce the cost of the electric motor 100, it is better to reduce the number of the permanent magnets 11 to the extent that a required amount of magnetic flux can be provided. At this time, the volume per permanent magnet 11 may be increased to the extent that the total usage amount of the permanent magnets 11 per electric motor 100 does not increase. If the permanent magnets 11 are enlarged to the extent of not exceeding an appropriate value of the production facility, the processing cost rate is reduced. Therefore, even if the total usage amount of the permanent magnets 11 per electric motor 100 is the same, the sum of processing costs of the permanent magnets 11 is reduced, and cost per electric motor 100 is reduced.

In the present embodiment, the rotor 20 is of a consequent pole type, and the number of the permanent magnets 11 is half the number of the poles. As a result, compared with the case where all magnetic poles are formed by the permanent magnets 11, the usage amount and processing cost of the permanent magnets 11 can be reduced.

As described above, according to the present embodiment, it is possible to provide the electric motor 100 capable of achieving lower cost, lower vibration, and lower noise.

In the present embodiment, the electric motor 100 is an electric motor with ten poles and twelve slots, but is not limited thereto. For example, such as ten poles and nine slots, eight poles and twelve slots, eight poles and nine slots, six poles and nine slots, or four poles and six slots, a combination of the number of poles and the number of slots is selected according to the application and performance of the electric motor 100.

Further, in the present embodiment, the permanent magnets 11 are neodymium sintered magnets, but may be other rare earth magnets, and may be permanent magnets other than rare earth magnets.

Figure 14:
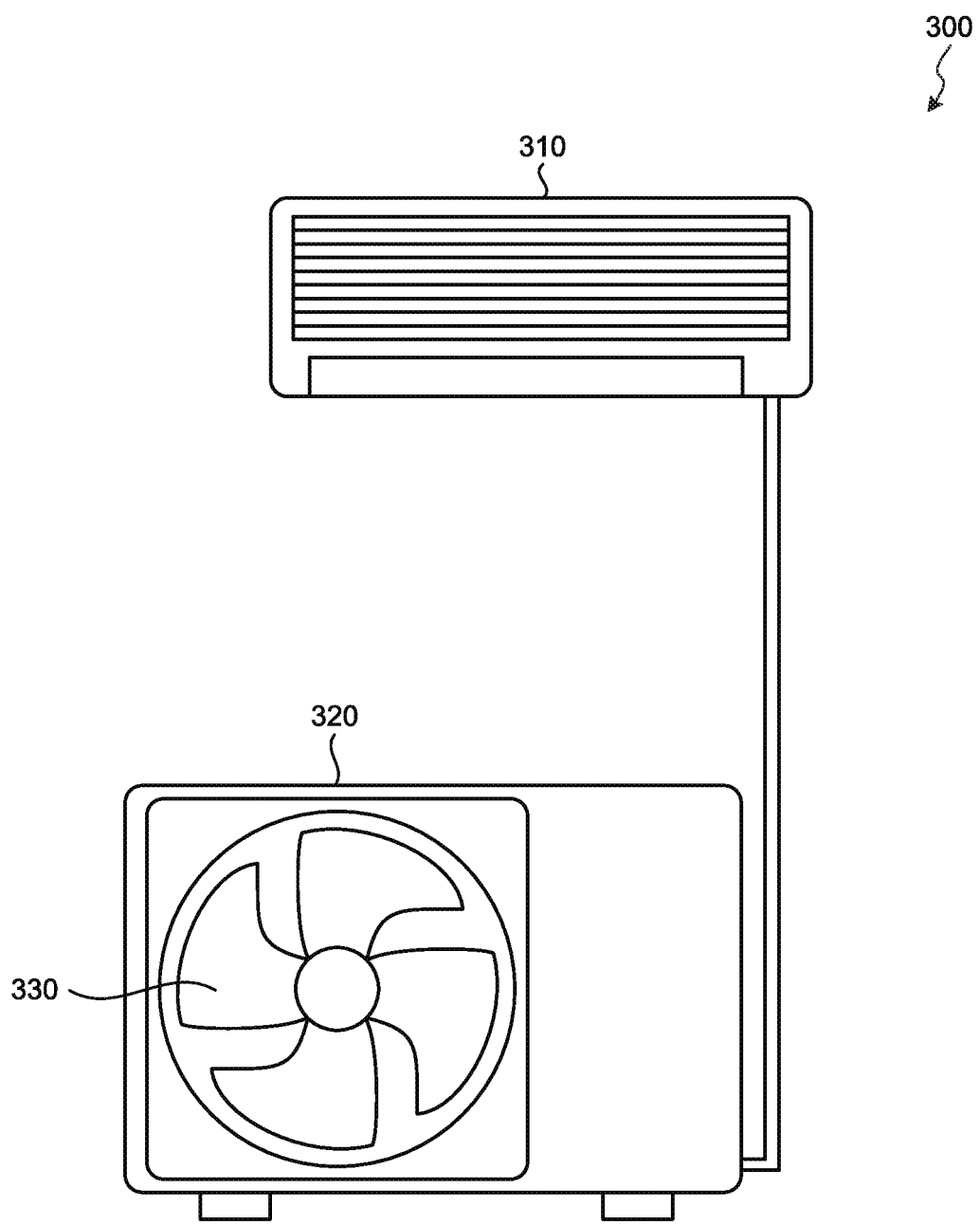
FIG. 14 is a diagram illustrating an example of the configuration of an air conditioner according to the present embodiment.

FIG. 14 is a diagram illustrating an example of the configuration of the air conditioner according to the present embodiment. An air conditioner 300 includes an indoor unit 310 and an outdoor unit 320 connected to the indoor unit 310. An indoor unit blower not illustrated is mounted in the indoor unit 310, and an outdoor unit blower 330 is mounted in the outdoor unit 320. Further, a compressor not illustrated is mounted in the outdoor unit 320. For the blowers and the compressor, the electric motor 100 according to the present embodiment is used.

In this way, by using the electric motor 100 as a driving source of the blowers and the compressor of the air conditioner 300, the air conditioner 300 can be reduced in cost, vibration, and noise.

Note that the electric motor 100 according to the present embodiment can be mounted in an electric apparatus other than the air conditioner, and also in this case, can provide the same effects as in the present embodiment.

The configuration illustrated in the above embodiment illustrates an example of the subject matter of the present invention, and can be combined with another known art, and can be partly omitted or changed without departing from the scope of the present invention.

The invention claimed is:

1. An electric motor comprising:
an annular stator; and
a consequent-pole-type rotor comprising:
   an annular rotor core disposed on an inner side of the annular stator, and
   a plurality of permanent magnets disposed inside the annular rotor core and arrayed in a circumferential direction of the annular rotor core,
wherein the annular stator is covered with an unsaturated polyester resin,
wherein a stator core of the annular stator is formed in an annular shape with a plurality of core segments each having a yoke and a tooth projecting from the yoke arrayed such that each of the plurality of core segments is in contact with another adjacent one of the plurality of core segments, and adjacent two of the yokes are connected to each other by a thin-walled portion,
wherein a hole surrounded by the two adjacent yokes is formed between the yokes, the unsaturated polyester resin is provided in the hole, and the unsaturated polyester resin constrains the annular stator when cured, and
wherein a relationship of A>B>0 is satisfied where A is a thickness from an outer peripheral portion of the stator core to an outer peripheral portion of the unsaturated polyester resin, and B is a thickness from an inner peripheral portion of the stator core to an inner peripheral portion of the unsaturated polyester resin.

2. An electric motor comprising:
an annular stator; and
a consequent-pole-type rotor comprising an annular rotor core disposed on an inner side of the annular stator, and a plurality of permanent magnets disposed inside the annular rotor core and arrayed in a circumferential direction of the annular rotor core,
wherein the annular stator is covered with an unsaturated polyester resin, and includes a stator core formed by a plurality of core segments each having a yoke and a tooth projecting from the yoke,
wherein adjacent two of the yokes are connected to each other by a thin-walled portion, a hole surrounded by the two adjacent yokes is formed between the yokes, the unsaturated polyester resin is provided in the hole, and the unsaturated polyester resin constrains the stator when cured,
wherein the rotor core includes at least one first slit provided inside the rotor core and disposed on an outer side of each of the plurality of permanent magnets in a radial direction of the rotor core, and at least one second slit provided in an outer peripheral surface of the rotor core and arranged between the plurality of permanent magnets adjacent to each other, wherein the at least one first slit is not open to the outer peripheral surface of the rotor core, and the at least one second slit is open to the outer peripheral surface of the rotor core, and wherein a relationship of A>B>0 is satisfied where A is a thickness from an outer peripheral portion of the stator core to an outer peripheral portion of the unsaturated polyester resin, and B is a thickness from an inner peripheral portion of the stator core to an inner peripheral portion of the unsaturated polyester resin.

3. The electric motor according to claim 2, wherein a total area of the at least one second slit is larger than a total area of the at least one first slit.

4. The electric motor according to claim 2, wherein a number of second slits including the at least one second slit is larger than a number of first slits including the at least one first slit.

5. The electric motor according to claim 2, wherein a width of the at least one second slit in the radial direction of the rotor core is larger than a width of the at least one first slit in the radial direction.

6. The electric motor according to claim 2, wherein a width of the at least one of second slit in a direction at right angles to the radial direction is larger than a width of the at least one first slit in a direction at right angles to the radial direction.

7. The electric motor according to claim 2, wherein the rotor comprises a plurality of first magnetic poles each formed by a corresponding one of the plurality of permanent magnets, and a plurality of second magnetic poles each formed between the permanent magnets adjacent to each other in the rotor core, and having a polarity different from a polarity of the first magnetic poles, and an outer diameter of the rotor core at the first magnetic poles is equal to an outer diameter of the rotor core at the second magnetic poles.

8. An air conditioner comprising the electric motor according to claim 1.

9. An air conditioner comprising the electric motor according to claim 7.

10. The electric motor according to claim 1, wherein an outer shape of the rotor core is a shape in which an outer diameter of the rotor core is a maximum at pole centers of the permanent magnets and is a minimum at inter-pole spaces of the permanent magnets, a circumferential width of each magnet hole provided on the rotor core is larger than a pole pitch, and the rotor has a plurality of first magnetic poles that are formed by the respective permanent magnets and a plurality of second magnetic poles each of which is formed in the rotor core between the permanent magnets adjacent to each other and has a polarity different from that of the first magnetic poles, the outer diameter of the rotor core at the first magnetic poles being equal to the outer diameter of the rotor core at the second magnetic poles.

11. The electric motor according to claim 2, wherein an outer shape of the rotor core is a shape in which an outer diameter of the rotor core is a maximum at pole centers of the permanent magnets and is a minimum at inter-pole spaces of the permanent magnets, a circumferential width of each magnet hole provided on the rotor core is larger than a pole pitch, and the rotor has a plurality of first magnetic poles that are formed by the respective permanent magnets and a plurality of second magnetic poles each of which is formed in the rotor core between the permanent magnets adjacent to each other and has a polarity different from that of the first magnetic poles, the outer diameter of the rotor core at the first magnetic poles being equal to the outer diameter of the rotor core at the second magnetic poles.

* * * * *